3,409,446
PROCESS FOR PREPARING AN EGG CONCENTRATE
Hendrik A. Van Olphen, Bloemendaal, Netherlands, assignor to Naamloze Vennootschap Van Olphen, Nederhorst den Berg, Netherlands
No Drawing. Filed May 13, 1965, Ser. No. 455,641
Claims priority, application Netherlands, Dec. 10, 1964, 6414360
8 Claims. (Cl. 99—210)

ABSTRACT OF THE DISCLOSURE

This invention relates to an egg-sugar concentrate which may be preserved and stored for long periods without deterioration and to a process of preparing same which comprises mixing an effective amount of sugar with said eggs followed by pasteurization and subsequent evaporation of the chemically unbound water.

---

This invention is directed to a method of preparing an egg concentration and more specifically to a method of preparing an egg concentration which can be preserved and stored over long periods of time. Normally, egg concentrations have poor preservation or keeping properties and are, therefore, difficult to store in the concentrated form for any period without losing their original qualities of taste, smell, etc. It has been discovered according to this invention, however, that it is possible to preserve or keep a concentration of eggs for periods of approximately 100 times over that originally thought possible. For example, it has been proposed in Netherlands patent specifications 20,929 and 48,365 to preserve the egg contents by evaporating a mixture of said eggs and glycerol so as to obtain a paste consistency. This mixture may also contain, if desired, an acid salt. The process in accordance with these specifications, however, is at a disadvantage in that it requires an evaporation which is rather time-consuming and ranges over a period of 2 to 3 days. Still another disadvantage is the fact that the products obtained in accordance with these specifications contain glycerol which is considerably less desirable for human consumption and particularly undesirable for baking purposes.

Accordingly, it is an object of this invention to provide a process whereby an egg concentration can be preserved over long periods of time and still retain their original characteristics of smell, taste, etc.

It is still another object of this invention to provide a process whereby eggs can be concentrated and stored for long periods of time without decomposing by adding thereto an effective amount of sugar. The mixture of egg and sugar is pasteurized and subsequently evaporated to remove a portion of the uncombined water.

It is still another object of this invention to provide an egg concentration which can be reconstituted and used for human consumption after long periods of time without any loss of its original properties.

These and other objects will become obvious from a further and more detailed description of the invention as follows.

It has been discovered, quite unexpectedly, that it is possible to prepare an egg concentration which has a long storage life by adding thereto an effective amount of sugar. More specifically, it has been discovered that an egg concentration can be prepared by mixing approximately 0.5 parts-by-weight of sugar for every part-by-weight of egg composition. In other words, the ratio of the egg mass to sugar is approximately 2 to 1. This egg-sugar mixture is then pasteurized at temperatures ranging from about 65° to 70° C. and more preferably at a temperature ranging from about 67°–68° C. and then subject to an evaporation in a normal vacuum evaporator. Here, the evaporation takes place in a thin layer of liquid, which is in contact with the entire heat-exchange surface. The intimate contact of the liquid with the heat-exchange surface provides for a uniform and quiet evaporation. The evaporation is carried out so as to remove only a portion of the uncombined water but not the chemically combined water.

The mixture of egg and sugar is placed in the vacuum evaporator at a temperature of about 20°–25° C. and acquires within about two or three seconds a solid content ranging from about 50% to 76% by evaporating the free or uncombined water in the evaporator. The temperature used for the evaporation is held constant or substantially the same value throughout the dehydration process.

By exposing the egg and sugar mixture to pasteurization temperatures of approximately 67°–68° C., for example, for a period of about 20 minutes, it is possible to kill any pathogenous bacteria, such as coli, salmonellae, etc. Moreover, it is possible to kill the bacteria by high vacuum of the evaporator. Bacteriological culture tests, with samples taken at various stages of the process, have shown that the number of germs per gram of egg mass was decreased in each of the successive stages. The process of this invention does not affect the water bonded to the albumin so that the quality of the albumin and the other constituents of the egg is maintained, particularly those qualities relating to the foaming and coagulating properties. By gas-chromatographically, it is possible to determine that the egg mass has not changed in either its qualitative, quantitative or structural characteristics even though it is known that normally the egg mass, particularly the albumin, is highly unstable and, therefore, subject to irreversible change under the influences of increased temperature, and other physical treatments, such as centrifugal forces, etc.

When the hen egg concentrate, for example, produced in accordance with the process of this invention, is subsequently diluted to its normal solid content of about 26%, it has been found to have the same properties as the original material.

For purposes of comparison, the foaming qualities and coagulation properties of the various materials were tested as follows: Approximately 200 cc. of an egg mass was beaten for about 5 minutes and thereafter tested to determine the final volume and "drip" (amount of liquid settled in one hour). The drip test is a means of determining the stability of the foam. Thus, the more stable the foam, the less the drip. The results were as follows:

TABLE I

| | Final Volume, cm.$^3$ | Drip, cm.$^3$ | Coagulation |
|---|---|---|---|
| (1) Fresh eggs | 1,300 | 80 | Positive. |
| (2) Egg mass (50% solids) | 1,500 | 60 | Do. |
| (3) Egg Mass (26% solids) +sugar.[1] | 1,200 | 80 | Do. |
| (4) Egg mass (50% solids) +sugar. | 1,700 | 50 | Do. |

[1] Sugar added separately.

It can be seen from the above data that the foaming qualities of the egg concentrates were substantially improved. This improvement may be explained by the fact that the egg mass contains fats which have a tendency to increase the surface tension. Due to the expansion in the vacuum, these fats are emulsified to very fine particles by means of an emulsifier inherently present in the egg composition. The surface tension increasing power of the free fats is decreased so that the action of the emulsifier on them is increased, thus resulting in greater foaming capacity.

TABLE II

| | Beat |
|---|---|
| Egg mass | 1300 |
| Egg mass+5% fat | 250 |
| Egg mass+5% emulsified fat | 700 |

It can be seen from the data in the above table that the amount of foam obtained from the composition wherein the fat is emulsified is substantially greater than the amount of foam obtained where the fat is in unemulsified form. It is the unemulsified fat which increases the surface tension and, thus, decreases the foam-forming capacity.

The appearance of the concentrate comprising a mixture of the egg and sugar changes from an opalescent to a transparent, honey-thick liquid. This is caused by the homogeneous distribution of the sugar through the egg mass by means of the vacuum evaporator. The sugar increases the stability of the foam produced by the egg mass, i.e., the foam becomes firmer and there is less drip. The concentrated product which comprises the egg mass from which about ⅔ of the total amount of water has been withdrawn and replaced with about the same amount of sugar, has a smell and taste similar to that of the original egg. The preservation or keeping qualities of the products of this invention may be illustrated by the following examples. Four jars, marked A, B, C and D were filled with the egg concentrate of this invention and tested as follows:

TABLE III

| Jar | Conditions | Remarks |
|---|---|---|
| A | Incubator at 37° C | Smell and taste changed after 30 days. |
| B | Held at room temperature | Exhibited no substantial deterioration after 3 months. |
| C | Refrigerated at −3° C | No substantial change in quality after 6 months. |
| D | Refrigerated at −15° C | No deterioration; can probably be held in this condition for unlimited period of time. |

A hen's egg mass containing known preserving agents, such as boric acid or sodium benzoate, was compared with the hen egg concentrate prepared in accordance with this invention which contained about 50% of sugar. The results of the comparison are as follows:

TABLE IV

| | Hen egg mass+ preserving agent | Hen egg mass+ about 50% sugar |
|---|---|---|
| Preserving or keeping qualities | | Substantially improved. |
| Separation during storage | Separated into upper and lower layer. No emulsifying power. | No separation; remains uniform, transparent. Emulsifying power maintained. |

After a storage of about three months at an ambient temperature of 18° C. (room temperature), the taste, smell and outward appearance of the composition of this invention was substantially unaltered. Thus, the advantages of the products obtained in accordance with this invention include the fact that the composition contains a lower germ factor, can be stored or kept for long periods of time without the use of known preserving agents, and has better foaming characteristics. Moreover, by utilizing the concentrates of this invention, it is possible to store the products because of their decreased volume with no additional cost for freezing. In addition, the free fats are better distributed throughout the concentrate and the emulsifying power of the mass is maintained with no separation taking place during storage.

Generally speaking, the presence of the sugar in the final product will not be objectionable to the consumer since the combination of eggs and sugar as a raw material are quite conventional for a number of uses. Sugar as such may be employed in combination with the egg mass or it may be used in the form of a syrup.

While this invention has been described with respect to a number of specific embodiments, it is obvious that there are other variations and modifications which can be employed without departing from the spirit of the invention, except those modifications not particularly pointed out in the appended claims.

I claim:

1. A process for preparing an egg concentrate which comprises mixing an effective amount of sugar with eggs, pasteurizing said mixture and subsequently evaporating from the mixture a major portion of the chemically unbound water at temperatures ranging from about 20° to 25° C., under a vacuum.

2. The process of claim 1 further characterized in that the mixture is pasteurized at a temperature ranging between 67°–68° C.

3. The process of claim 1 further characterized in that the mixture consists essentially of 0.5 part-by-weight of sugar and 1.0 part-by-weight of the eggs.

4. The process of claim 3 further characterized in that the sugar is in the form of a syrup.

5. The process of claim 4 further characterized in that the chemically unbound water is evaporated from the mixture in a thin-layer vacuum evaporator.

6. The process of claim 1 further characterized in that the egg and sugar mixture is evaporated to a solid content of about 50% to 76%.

7. A process for preparing a concentrated egg composition which comprises pasteurizing a mixture of hen egg and sugar for about 20 minutes at a temperature of about 67° to 68° C. and subsequently removing a major portion of the unbound water by evaporation under a reduced pressure at a temperature ranging from about 20° to 25° C.

8. The process of claim 7 further characterized in that the evaporation of the unbound water takes place in a thin-layer vacuum evaporator.

References Cited

UNITED STATES PATENTS

| 692,268 | 2/1902 | Goodlett | 99—161 |
| 2,901,360 | 8/1959 | Gorman et al. | 99—210 |
| 3,170,804 | 2/1965 | Kline et al. | 99—210 |

FOREIGN PATENTS

| 15,762 | 1893 | Great Britain. |

LIONEL M. SHAPIRO, *Primary Examiner.*